April 30, 1935.  G. ARMISTEAD, JR., ET AL  1,999,270
TREATING HYDROCARBON OILS
Filed June 2, 1928  2 Sheets-Sheet 1
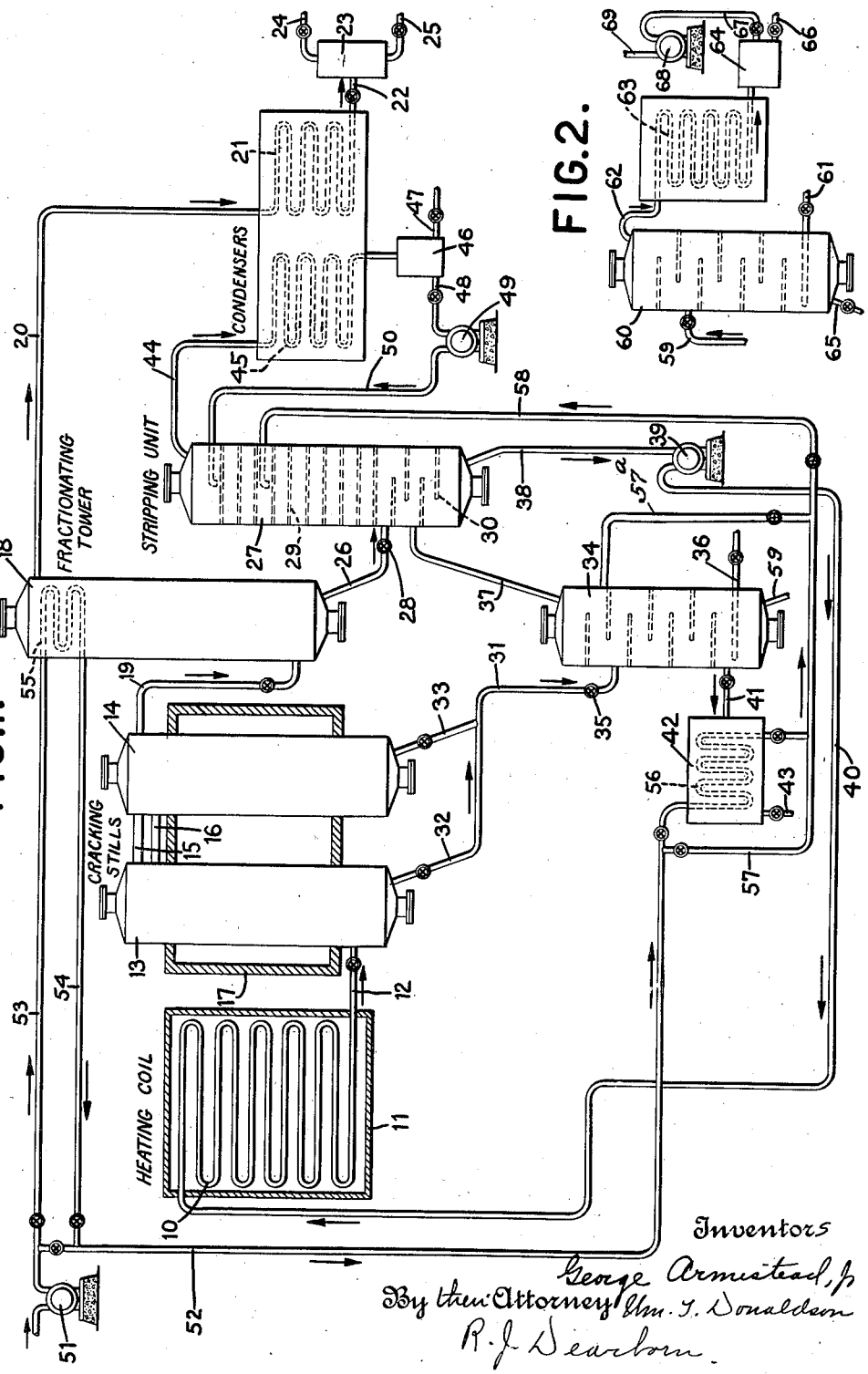
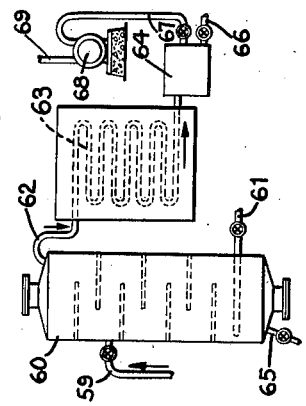
Inventors
George Armistead, Jr.
Wm. J. Donaldson
R. J. Dearborn
By their Attorney

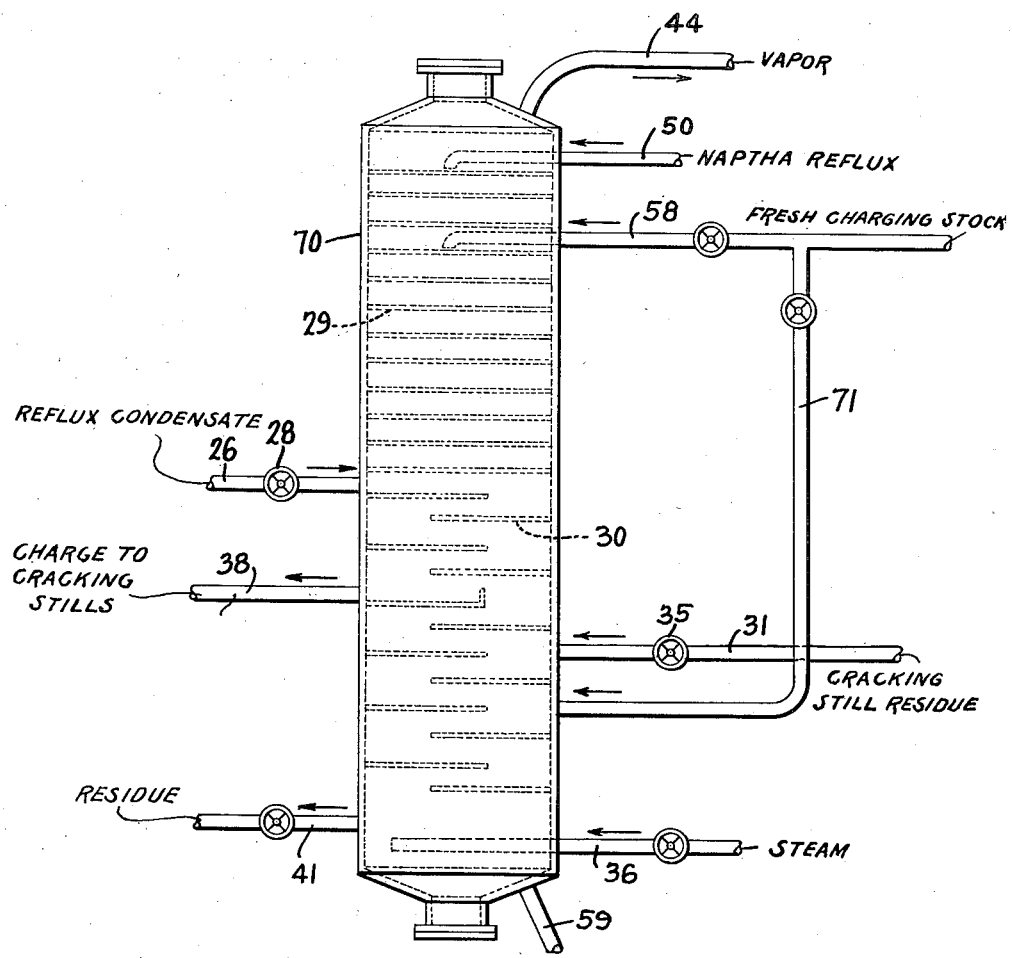

Patented Apr. 30, 1935

1,999,270

UNITED STATES PATENT OFFICE 1,999,270

TREATING HYDROCARBON OILS

George Armistead, Jr., Port Arthur, Tex., and William T. Donaldson, Brooklyn, N. Y., assignors to The Texas Company, New York, N. Y., a corporation of Delaware Application June 2, 1928, Serial No. 282,314

11 Claims. (Cl. 196—49)

This invention relates to the conversion of higher boiling hydrocarbons into lower boiling ones and has in view particularly the production of maximum quantities of light distillates, such as gasoline or naphtha, from a given charging stock.

One of the objects of the invention is to provide a combined topping or fractionating and cracking system adapted, not only for the conversion of higher boiling hydrocarbons into lower boiling hydrocarbons such as gasoline, but also to enable the removal of lighter hydrocarbons, such as gasoline, that may be contained in the hot products derived from the cracking reaction, or that may be contained in the charging stock to the system.

It is an object of the invention to avoid the rerunning of distillates or residues derived from a cracking system and to provide for the fractionation or stripping of these products in a continuous system operated in connection with the cracking system and in a preferred embodiment of the invention it is contemplated that the oil may be subjected to the cracking reaction for the production of light products such as gasoline and the resulting products treated in a continuous closed system from which two final products are obtained, viz: the gasoline or light distillate and a residual fuel oil.

It is an object of the invention to facilitate the maximum economy of the external heat employed in the system and to conserve, so far as economical, the heat derived from the cracking operation and utilize this heat in a novel and effective manner in distilling tar or residue derived from the cracking operation, in stripping reflux condensate and in heating or stripping the fresh charging stock.

The invention contemplates the heating or stripping of the charging stock in contact with hot products derived from the cracking operation. More specifically, the invention contemplates a process wherein hot tar or residue is withdrawn from the cracking chamber and the charging stock brought into contact with the heated tar or with vapors derived therefrom in order to thereby supply heat to the charging stock, and in case the charging stock contains low boiling constituents, to strip the charge of these low boiling constituents before it is introduced into the cracking zone.

The invention also contemplates a process in which reflux condensate obtained from the evolved vapors from a cracking still, together with hot tar or residue withdrawn from the cracking still, are brought into contact with the fresh charging stock to thus recover from the reflux condensate and tar or residue and the charging stock itself low boiling constituents, such as gasoline or naphtha contained therein, and at the same time to thus provide a charging stock including the original or fresh charge together with certain intermediate products, or so-called cycle stock, adapted for charging to the cracking stills.

One of the objects of the invention is to reduce the number of heating coil units, distilling chambers, fractionating units and other elements that may go to make up a complete system for carrying on a cracking operation, the distilling or stripping of tar or residue obtained therefrom, dephlegmating or fractionating the evolved vapors and stripping or fractionating reflux condensate adapted for cyclic passage to the cracking zone.

Another object of the invention is to provide an effective means and method for distilling off low boiling constituents from the charging stock including not only the original or fresh charge, but also the cyclic products that may be included in the charge going to the cracking stills.

The invention seeks to provide a process wherein the cracking operation is carried on under conditions most favorable for the promotion of the cracking reaction, that is under superatmospheric pressure, while the stripipng or fractionating of the hot products derived from the cracking operation, such as tar or residue, or condensates obtained from the process and the stripping of fresh charging stock containing low boiling constituents such as gasoline or naphtha fractions, is carried on under conditions most favorable for the effective stripping of these products of their more volatile fractions, or in other words at reduced pressure or at relatively low pressure as compared with that employed in the cracking operation.

In order to more fully describe the invention reference will now be had to the accompanying drawings wherein:

Figure 1 is a diagrammatic sectional elevation of an apparatus constructed in accordance with the invention and constituting an embodiment thereof.

Figure 2 is a partial sectional elevation illustrating a modification of the invention.

Figure 3 is an enlarged sectional elevation showing a modified stripping apparatus.

In the apparatus thus illustrated a coil and drum or tube and tank cracking apparatus is shown but it is to be understood that the practice of the invention is not limited to any particular type or method of cracking operation per se. The apparatus thus illustrated includes a heating coil 10 mounted in a furnace 11, which coil is preferably constructed so as to be able to stand a high superatmospheric pressure and may be adapted to heat the oil in transit therethrough to a cracking temperature. A transfer line 12 is provided for delivering the heated oil to a battery of stills comprising the stills 13 and 14 equipped with interconnecting lines 15 and 16 and mounted in a furnace 17. It may be pointed out that if desired the stills may be heat insulated and maintained at the desired cracking and distilling temeprature by means solely of the hot oil entering from the transfer line 12. We believe, however, that while the bulk of the heat required may be imparted to the oil before it enters the transfer line 12 that, nevertheless, it is ordinarily preferable to enclose the cracking chambers or stills in a furnace which is moderately fired as compared with the furnace 11. If desired a single still may be used in lieu of the plurality of stills indicated in the drawings.

A dephlegmator or fractionating chamber 18 is provided for dephlegmating or fractionating the evolved vapors from the cracking stills and a vapor line 19 is shown extending from the still 14 to the dephlegmator 18. The dephlegmator may well be constructed in the form of a bubble tower. It is provided with a vapor line 20 which extends to a condenser 21 having an outlet pipe 22 to a receiver 23 equipped with a gas outlet line 24 and a liquid or distillate draw-off line 25.

The dephlegmator 18 is also provided with a line 26 arranged to conduct reflux condensate to a fractionating or stripping tower 27. The dephlegmation or fractionation of the evolved vapors from the cracking stills may be carried on under superatmospheric pressure, such as that approximating the pressure obtaining in the cracking stills and line 26 is equipped with a pressure reducing valve 28 in order that the stripping or fractionating of the reflux condensate may be carried on in the tower 27 under reduced pressure. The chamber 27 may be in the form of any suitable dephlegmating or fractionating apparatus, but in the preferred arrangement shown, it is provided with an upper section containing bubble trays 29 and with a lower section containing mere plates or baffles 30.

A tar or residue line 31 having valved branch lines 32 and 33 to the stills 13 and 14, respectively, is provided for withdrawing liquid oil or residue from the cracking stills and delivering the liquid to an expansion chamber 34. A pressure reducing valve 35 is provided in the line 31 for reducing the pressure in the tar or residue distilling chamber 34. A steam line 36 is indicated for admitting live steam to the distilling chamber 34, but it may be pointed out that if desired heat may be applied by means of a closed steam coil in the chamber 34 or this chamber may be otherwise supplied with suitable heating and thus, for example, it may be mounted in a heating chamber utilizing waste heat that has been used in either the furnace 11 or the furnace 17, or both such furnaces.

The distilling chamber 34 is shown with a vapor line 37 communicating with the fractionating or stripping tower 27. Thus liquid or residue withdrawn from the cracking stills and reflux condensate obtained by the dephlegmation or fractionation of the evolved vapors from the cracking stills are subjected to distillation or stripping in a low pressure distilling unit consisting of the two chambers 34 and 27, stripped or fractionated reflux condensate being collected in the bottom of the tower 27 and the stripped residue being collected in the bottom of the chamber 34. The reflux condensate is withdrawn from the tower 27 by pipe 38 and constitutes the final charge to the cracking system being picked up by a pump 39, preferably a hot oil pump, having a discharge line 40 which communicates with the coil 10. The stripped tar or residue obtained in the chamber 34 is withdrawn through a pipe 41 to a cooler 42 provided with an outlet pipe 43.

If desired the low pressure distilling unit for distilling and fractionating the tar or residue and the reflux condensate may be in the form of a single chamber 70, as shown in Figure 3, instead of the two chambers shown in Figure 1, and in such case the tar or residue from the cracking stills is preferably admitted through the line 31 to a lower section of the chamber while the reflux condensate from the dephlegmator 18 is admitted through the line 26 at a point higher up in the chamber and the stripped or fractionated reflux condensate is trapped out at a point above that of the introduction of the tar or residue and conducted by the line 38 to the pump 39 and coil 10 so that the charge to the cracking stills may not be contaminated with the tarry or residual products withdrawn from the cracking stills. The fresh charging stock is admitted through the line 58 at a point above the line 38, or the fresh charge may be admitted through a branch line 71 at a point in the tower below the line 38 so that the introduction of residual oil to the cracking zone may be thus avoided.

The tower 27 is provided with a vapor line 44 extending to a condenser 45 provided with a distillate receiver 46. The receiver is shown equipped with an outlet pipe 47 intended for removing the distillate to storage and also with a second outlet pipe 48 extending to a pump 49 provided with a discharge line 50 so as to pump condensate to the tower 27 to serve as a reflux or cooling medium therefor.

A charging pump 51 is provided for introducing the fresh or initial charging stock to the system. The charging line 52 is provided with branch lines 53 and 54 extending to a coil 55 so that a portion or all of the charge may be passed through the coil 55 to serve as a cooling medium for the tower 18. If desired, the tower 18 may be equipped with a separate reflux condenser for supplying reflux to the top of the tower and in such case the coil 55 may be disposed in such reflux condenser. The line 52 is shown as extending to a coil 56 disposed in the heat exchanger 42 so that the charge may be further heated by heat exchange with the hot residue withdrawn from the distilling chamber 34. A by-pass line 57 is provided so that, if desired, the heat exchange coil 56 may be by-passed. An extension 58 of the charging line communicates with the low pressure tower 27. If desired the fresh charge, after having been heated in either the coil 55 or the coil 56, or in both such coils, and before being introduced into the tower 27, may be passed through a coil in a lower temperature section of the furnace 11, that is through a coil heated by the waste gases that have been employed in heating the coil 10 in order that the charge may be further heated before being passed into the tower 27 for vaporization. The line 57 is provided with a branch line 57a for admitting charging stock to the distilling chamber 34.

In practicing the invention with the apparatus illustrated, the fresh charging stock is drawn from a suitable source by the pump 51 and introduced into the low pressure distilling or fractionating tower 27 after such preheating in the heat exchange coils 55 and 56 or by other means as may be desired. The charging stock may consist of any of the usual stocks that are charged to cracking stills or it may consist of crude petroleum. Thus for example in the case of crude petroleum or a gas oil charging stock containing gasoline or other light constituents these lighter fractions are distilled off from the charge in the low pressure distilling tower 27. In this way even though the original charging stock may contain considerable quantities of gasoline, for example, the charge as introduced to the cracking zone may be substantially free of gasoline constituents or in other words, the initial boiling point of the charge, as introduced to the cracking zone, may be as high or higher than the end point of the gasoline or light distillate which is collected in the receiver 23. The fresh charge is introduced to the fractionating tower 27 at a midpoint therein, the exact point depending, of course, upon the temperature to which the charge has been raised before being introduced into the tower. It is ordinarily preferable to raise the charge, as by heat exchange in the coils 55 and 56, to temperatures of about 400° F. to 500° F., to introduce the charge to a midpoint in the tower and to provide cooling at the top of the tower to control the end point of the vapor fraction taken off through the vapor line 44.

The charging stock which is withdrawn from the tower 27 by a pump 39 is forced through the line 40 into the coil 10 wherein it is raised to a cracking temperature and then discharged into the cracking stills for cracking and vaporization. In one method of operation the valve in the transfer line 12 remains open and the stills 13 and 14 are held at approximately the same pressure as that of the outlet of the coil 10, or in other words there is merely the drop in pressure which is incident to the passing of the oil through the coil 10. In another method of operation the valve in the transfer line may be employed as a pressure reducing valve so that the stills may be held at a materially lower pressure than that obtaining in the coil 10 and in this type of operation it is advantageous to operate at relatively high temperatures and pressures in the coil 10, such for example as about 800 or 900 lbs. pressure at temperatures of the order of 900° F. and to reduce the pressure in the stills 13 and 14 to, for example 200 to 400 lbs. But while the precise method of operation may be varied it may be stated that in employing the apparatus shown it is preferable to raise the oil to a cracking temperature in the coil 10, either with or without appreciable cracking in the coil 10, and to maintain the oil in the stills 13 and 14 at cracking temperatures with removal of the evolved vapors through the vapor line 19 to the dephlegmator 18.

These vapors are subjected to dephlegmation or rectification in the tower 18 and controlled cooling is supplied to the top of the tower to regulate the end point of the gasoline or light distillate which passes off through the vapor line 20 and which is condensed in the condenser 21 and collected as a distillate in the receiver 23. The fractionating tower 18 may be operated at approximately the pressure of the cracking stills 13 and 14, or the pressure may be reduced in the tower 18 by employing the valve indicated in the line 19 as a pressure reducing valve. Thus if desired, the pressure in the heating coil 10, cracking stills 13 and 14 and fractionating tower 18 may be progressively reduced or stepped down, or the heating coil 10 and stills 13 and 14 may be held at approximately the same pressure, and the fractionating tower 18 at a lower pressure, although still preferably at superatmospheric pressures. In one example of the invention the heating coil 10 may be held at about 800 or 900 lbs. pressure and operated to deliver oil to the transfer line 12 at temperatures of the order of 900° F., while the cracking stills are held at pressures of about 300 or 400 lbs. at temperatures of the order of 800° F., with the fractionating tower 18 under approximately 300 or 400 lbs. pressure, and having a temperature at the bottom ordinarily slightly lower than that obtaining in the cracking stills, such for example as about 750° F., or the pressure in the fractionating tower 18 may be reduced to, for example, about 150 lbs.

The reflux condensate that collects in the bottom of the tower will ordinarily contain greater or less proportions of gasoline or light constituents and this condensate is passed through the line 26 having the pressure reducing valve 28 so as to discharge the condensate into the fractionating chamber 27 at reduced pressure. By reason of the reduced pressure the contained heat in the oil permits vaporization to take place so that the light constituents such as gasoline may be distilled out.

Tar or residue is withdrawn from the cracking stills 13 and 14 through the draw-off lines 32 and 33 and passed thence through the line 31 having the pressure reducing valve 35 into the distilling and expansion chamber 34. Ordinarily, when the charge is introduced to the still 13, the bulk of the tar is preferably withdrawn from the still 14. In one method of operation the drawing of tar instead of being done by taking shots in accordance with the most usual practice in pressure cracking operations, is withdrawn in a practically continuous manner without substantial interruption. In such a method of operation it is desirable, and in fact practically necessary to draw off a residue of a somewhat lighter gravity than in the case when the withdrawal is made by taking shots. In other words the tar withdrawn in the continuous method contains greater proportions of lighter constituents but this method of operation is, notwithstanding this fact, of considerable advantage in view of the benefit obtained by continuity of operation in controlling the distillation in the distilling chamber 34, and in view of the conservation of heat and economical method of operation accomplished by our invention, the resultant addition to the quantity of cycle stock to be returned to the cracking zone is of relatively small consequence.

In methods of operation where the tar is withdrawn by taking shots with the resultant periodic influx of material into the tar distilling chamber, there is a consequent variation in pressure in the distilling chamber which makes it difficult to control the distillation so as to obtain the desired products. In accordance with our invention, when the tar is withdrawn from the cracking stills by taking shots or drags the difficulty of coordinating the cracking stills with the tar distilling units is lessened to a considerable degree by reason of the fact that not only the tar, but also the reflux condensate and the charging stock are being distilled in the same distilling unit, with the result that the tar constitutes a much smaller proportion of the total material undergoing distillation, and to that extent the variations in pressure occasioned by the periodic introduction of tar into the distilling unit is lessened. If desired, an expansion chamber may be inserted between the cracking stills and the distilling chamber 34 to take care of the fluctuations in pressure occasioned by the intermittent withdrawal of tar from the stills, the expansion chamber being adapted to hold a material body of the withdrawn tar and to feed it in at a fairly constant rate to the distilling chamber 34, the feed being controlled by a constant flow regulator.

The contained heat in the withdrawn tar or residue operates to effect distillation in the chamber 34 and the distillation may be further facilitated by means of steam heating the chamber 34 or as indicated in the drawings by the introduction of live steam into the chamber. It will be noted that the temperature in the chamber 34, vapor line 37 and in the bottom of the tower 27, will be above the condensing temperature of the steam under the pressure employed so that the operation may be carried on without any material danger of getting shots of water into the cracking zone. However, if it is desired to avoid the use of live steam, an advantageous arrangement is to mount the chamber 34 in a heating chamber heated by waste gases, for example, from the furnace 17, so as to thereby maintain the proper temperature in the chamber 34.

The evolved vapors from the chamber 34 include the gasoline or light oil constituents having the boiling point of the product that is obtained in the receiver 23 together with certain intermediate products that may be referred to as kerosene or gas oil constituents and which constitute a cycle stock adapted for returning to the cracking zone. Similarly the reflux condensate introduced into the tower 27 contains light oil or gasoline constituents and also kerosene or gas oil components adapted for cycling in the cracking zone. Thus the overhead vapor fraction that is taken off the vapor line 44 and which is condensed in the condenser 45 and collected in the tank 46 includes the gasoline or light oil content of the reflux condensate that has been withdrawn from the dephlegmator 18, the gasoline or light oil content of the tar or residue that has been withdrawn from the cracking stills, together with the gasoline or light oil content of the fresh charging stock. Cooling is applied to the top of the tower 27 in order to regulate the boiling point of the vapor fraction taken off and this cooling is so controlled that the distillate as collected in the tank 46 may have substantially the same end point as that of the distillate collected in the receiver 23, or if desired, a fraction having a different boiling point may be taken off the tower 27.

When the charging stock is preheated, for example to a temperature approximating 450° or higher before introduction to the tower 27, it may be necessary to supply additional cooling to the top of the tower and this may conveniently be done by employing the pump 49 to withdraw distillate from the tank 46 and charge it to the top of the tower. Any excess distillate that remains in the tank 46 may be withdrawn to storage, or if desired, this distillate may be pumped by means not shown to the high pressure tower 18 in order that the distillate may be subjected to the polymerizing action that may take place under the high pressure of this tower. This is an advantageous method of operation since in such case only two final products, other than the exit gases, are withdrawn from the system, namely the gasoline condensate which is collected in the receiver 23 after having been subjected to the stabilizing or polymerizing action of the tower 18 and the residual oil that is withdrawn from the distilling chamber 34 through the line 41 and which constitutes a suitable fuel oil.

The charging stock that is withdrawn from the tower 27 and forced by the pump 39 to the heating coil 10 consists of the charge stripped of its gasoline content together with the intermediate or cycle products that have been obtained by the distillation or fractionation of the reflux condensate withdrawn from the dephlegmator 18 and the tar or residue withdrawn from the cracking stills. In case the initial or fresh charging stock be a distillate oil such for example as gas oil, the charge to the cracking section of the apparatus thus consists essentially of a distillate free from the residual products of crude petroleum. In case crude petroleum or a residuum thereof is the charging stock introduced to the tower 27, the charge to the cracking section will, of course, include residual products, but since these products are diluted with the cycle products, which are obtained as soon as the system is under operating conditions, the process facilitates the charging of the crude residuum to the cracking system. However, in one method of operation contemplated by the invention the fresh charge, instead of being introduced to the tower 27 is admitted through line 57a to the distilling chamber 34, or, as has been pointed out, is charged to the low pressure distilling unit 70 at a point below that from which the charge to the cracking section is withdrawn so that in this way the charging of residual oil to the cracking section is avoided.

The pressure in the stripping unit consisting of the vessels 27 and 34 is materially reduced from that obtaining in the cracking stills 13 and 14 and dephlegmator 18, so as to promote vaporization and accomplish the desired stripping of the products withdrawn from the high pressure zones. If desired, the pressure may be reduced to approximately atmospheric, however, some superatmospheric pressure is advantageous since it facilitates the withdrawal of the residue or fuel oil from the system. With a pressure of several hundred pounds in the cracking zone, the pressure may be reduced in the low pressure stripping zone to, for example 25 or 50 pounds. At such pressure the gasoline constituents may be readily distilled off from the charging stock, the reflux condensate and the tar. However, at such pressures difficulty is sometimes experienced in obtaining the maximum yield of cycle products from the pressure still residue and in such cases a desirable method is to provide another distilling unit in addition to that furnished by the vessels 34 and 27.

Thus the tar withdrawn from the cracking stills may be discharged into a stripping or distilling unit such as the vessel 34, and distillation carried on therein under pressures, for example, of 25 to 50 pounds or even higher, so that the gasoline constituents may be readily distilled off. In this method of operation it is preferable not to introduce live steam into the distilling chamber 34, although the chamber may be moderately heated if desired, but reliance is placed mainly or entirely on the contained heat in the hot products derived from the cracking reaction to maintain the desired distilling temperature. Ordinarily, when distilling by contained heat alone the residue obtained from the distilling chamber 34 may be substantially freed of its gasoline content and of a portion of its cycle stock content, but it may not be reduced sufficiently to meet standard flash test requirements for fuel oil.

This residue may therefore be withdrawn from the chamber 34 through a line 59 and introduced into a second tar stripping or distilling chamber 60 (see Fig. 2) which chamber is maintained at a still further reduced pressure preferably approximately atmospheric pressure or even under a vacuum. Live steam is preferably introduced into the chamber 60 through a line 61 so that the residue is reduced to the desired flash test and the maximum quantity of gas oil or suitable cycle stock constituents are taken off through a vapor line 62, condensed in a condenser 63 and collected in a receiving tank 64. Any water present in the distillate by the use of steam may be settled out and withdrawn from tank 64 through a line 66. The oil is either withdrawn to a suitable storage tank or is taken off by line 67 to a pump 68 having a discharge line 69. The line 69 may communicate either with the line 40 so that the distillate may be charged directly to the heating coil 10 or it may extend to the stripping tower 27 so that in case the distillate contains any fractions of lower boiling point than that desired in the charging stock, these fractions may be distilled off before the oil is passed to the cracking zone. The residual oil may be withdrawn by means of the line 65.

If it is desired to remove from the residue drawn from the cracking stills the maximum yield of cycle stock or distillate adapted for the return to the cracking zone, it is ordinarily preferable to distill the tar in two stages, that is, first distill it in the low pressure stripping unit comprising the vessels 27 and 34 or the vessel 70, wherein the tar is subjected to distillation together with the reflux condensate and fresh charging stock to thus remove gasoline or light constituents, and also ordinarily to remove from the tar a part of its cycle oil content, and then to subject the residue from the chamber 34 to a further distillation in the chamber 60 under still further reduced pressure and preferably with the aid of steam so that the maximum yield of cycle stock will be thus obtained. The residue thus produced which is drawn off through the line 65 may be filtered or settled to remove carbon and may be mixed with other oil to serve as fuel oil. If it is not desired to obtain the maximum yield of cycle stock from the pressure tar and it is merely intended to produce a residue adapted to meet the ordinary flash test requirements for fuel oil the distillation of the tar is best carried on in a single stage and in this method of operation the tar is distilled in the chamber 34 to distill off the gasoline content and a portion of the cycle stock, and upon being reduced to the desired flash test is withdrawn and after such filtering or settling as may be necessary, is marketed as fuel oil.

In a modification of the invention, the reflux condensate collecting in the tower 18 instead of being subjected to fractionation or distillation under reduced pressure, is drawn off by a hot oil pump and passed directly to the coil 10, being preferably admitted to the coil 10 at a point therein, wherein the temperature of the oil passed through the coil approximates that of the returned reflux condensate, and in this method of operation only the pressure tar and the fresh charging stock are distilled or stripped in the low pressure distilling unit.

Although the invention has been set forth for illustrative purposes as embodying more or less specific details of operation and structural arrangement, it will be understood that many modifications and variations thereof may be made without departing from the spirit and scope of the invention in certain of its aspects. Therefore, only such limitations should be imposed as are indicated in the appended claims.

What we claim is:

1. In the conversion of higher boiling hydrocarbons into lower boiling ones, the process that comprises, maintaining oil in a cracking zone under superatmospheric pressure and at a cracking temperature to effect cracking, dephlegmating evolved vapors while still under superatmospheric pressure to form reflux condensate, withdrawing residue from the cracking zone and reflux condensate from the dephlegmating zone and directing the residue and reflux condensate thus withdrawn into a fractionating tower maintained under pressure below that existing in the dephlegmating zone, introducing said residue into said tower at a point below the point of introduction of the reflux condensate and subjecting the fluids thus introduced to the tower to dephlegmation and fractionation therein to form an overhead vapor fraction and a residual oil.

2. In the conversion of higher boiling hydrocarbons into lower boiling ones, the process that comprises, maintaining oil in a cracking zone under superatmospheric pressure and at a cracking temperature to effect cracking, dephlegmating evolved vapors while still under superatmospheric pressure to form reflux condensate, withdrawing residue from the cracking zone and reflux condensate from the dephlegmating zone and directing the residue and reflux condensate thus withdrawn into a fractionating tower maintained under pressure below that existing in the dephlegmating zone, introducing the residue into said fractionating tower at a point below the point of introduction of the reflux condensate, introducing fresh charging stock into the fractionating tower, subjecting the fluids thus introduced to the tower to distillation and fractionation therein to form an overhead vapor fraction, a reflux condensate and a residual oil, withdrawing reflux condensate from the tower at a point therein above that of the introduction of the residue and fresh charging stock and passing the same to the cracking zone.

3. In the conversion of higher boiling hydrocarbons into lower boiling ones, the process that comprises, maintaining oil in a cracking zone under superatmospheric pressure and at a cracking temperature to effect cracking, dephlegmating evolved vapors while still under superatmospheric pressure to form reflux condensate, withdrawing residue from the cracking zone and reflux condensate from the dephlegmating zone and directing the residue and reflux condensate thus withdrawn into a fractionating tower maintained under pressure below that existing in the fractionating tower, introducing the residue into said tower at a point below the point of introduction of the reflux condensate, introducing fresh charging stock into the fractionating tower, subjecting the fluids thus introduced to the tower to distillation and fractionation therein to form an overhead vapor fraction, an intermediate fraction and a residual oil, withdrawing said intermediate fraction from the tower at a point therein above that of the introduction of the residue and passing the same to the cracking zone.

4. In the conversion of higher boiling hydrocarbons into lower boiling ones, the process that comprises subjecting the oil in a cracking zone comprising a still wherein vaporization takes place to cracking under superatmospheric pressure, dephlegmating evolved vapors while still under superatmospheric pressure to form a reflux condensate, expanding residue from the cracking still into a low pressure vaporizing chamber wherein vaporization takes place, bringing fresh charging stock into contact with vapors evolved from the cracked residue, bringing aforesaid reflux condensate into contact with said vapors, subjecting said vapors and fresh charging stock and reflux condensate in contact therewith to fractionation in a fractionating zone maintained under a pressure materially below that in said dephlegmating zone, withdrawing a liquid fraction from said fractionating zone and passing it as charging stock to the cracking zone.

5. In the conversion of higher boiling hydrocarbons into lower boiling ones, the process that comprises subjecting the oil in a cracking zone comprising a still wherein vaporization takes place to cracking under superatmospheric pressure, dephlegmating evolved vapors while still under superatmospheric pressure to form a reflux condensate, expanding residue from the cracking still into a low pressure vaporizing chamber wherein vaporization takes place, dephlegmating resultant vapors with fresh charging stock introduced into contact therewith, bringing uncondensed vapors from said last mentioned dephlegmation comprising vaporized constituents of the cracked residue and charging stock into contact with reflux condensate withdrawn from the pressure dephlegmator and subjecting the contacted liquids and vapors to dephlegmation in a fractionating zone at a pressure below that in said pressure dephlegmator, withdrawing from said zone a liquid fraction comprising stripped reflux condensate from the pressure dephlegmator combined with condensate formed in the condensation of vaporized constituents of the fresh charging stock and cracked residue and conducting said liquid fraction as charging stock to the cracking zone.

6. In the art of cracking petroleum oils, in which oil is cracked under high pressure and temperature in a cracking zone and vapors therefrom are subjected to reflux condensation in a refluxing zone under relatively high superatmospheric pressure, the improvement which comprises withdrawing residuum from said cracking zone under sudden reduction of pressure whereby substantial portions of said residuum are vaporized, passing the vapors from said residuum into a reflux tower from which substantially only pressure distillate vapors are removed and condensed, withdrawing reflux condensate from said refluxing zone and introducing it under sudden reduction of pressure into said reflux tower thereby to vaporize the lower boiling constituents and control the fractionation of the residuum vapors in said tower, and passing the combined condensate collecting in said tower into said cracking zone.

7. In the art of cracking petroleum oils, in which oil is cracked under high pressure and temperature in a cracking zone, and vapors thereof are subjected to reflux condensation in a reflux zone under a relatively high superatmospheric pressure, the improvement which comprises distilling residuum from said cracking zone, and passing the vapors therefrom into a rectifying tower maintained under a substantially lower pressure than that maintained in said reflux zone, withdrawing reflux condensate from said reflux zone, and introducing it with sudden reduction in pressure into said rectifying tower thereby to vaporize substantial portions thereof, passing substantially only pressure distillate vapors from said rectifying tower for final condensation and collection, and passing the resulting mixed condensate from said tower into said cracking zone for conversion into lower boiling products.

8. In the art of cracking petroleum oils in which oil is cracked under high pressure and at a high temperature in a cracking zone, and vapors produced from the oil are fractionated and subjected to reflux condensation in a rectifying zone, the improvement which comprises withdrawing residuum from said cracking zone into a vaporizing zone with a sudden reduction in pressure thereon whereby substantial portions of said residuum are vaporized, passing the vapors from said vaporizing zone into a vapor fractionating zone, passing reflux condensate from said rectifying zone into said fractionating zone in contact with the residuum vapors therein thereby to aid in the fractionation of the vapors in said fractionating zone and produce a mixed reflux condensate, removing and condensing substantially only pressure distillate vapors from said rectifying and fractionating zones, and subjecting the mixed reflux condensate collecting in said fractionating zone to cracking conditions of temperature and pressure.

9. In the conversion of higher boiling hydrocarbons into lower boiling ones, the process that comprises subjecting oil to cracking and vaporization under superatmospheric pressure in a cracking zone, subjecting evolved vapors while still under superatmospheric pressure to fractionation in a high pressure fractionating zone to form a condensate, expanding residue from the cracking zone into a low pressure zone where vaporization takes place and subjecting evolved vapors to fractionation, withdrawing condensate from the high pressure fractionating zone and subjecting the condensate to vaporization, refluxing vapors evolved from the expanded residue with unvaporized portions of said condensate, withdrawing a resultant liquid fraction and conducting it to said cracking zone.

10. The process of converting petroleum oils, which comprises cracking a relatively high boiling point oil under high pressure and temperature in a cracking zone, passing vapors therefrom into a rectifying zone maintained under a relatively high superatmospheric pressure, withdrawing residuum from said cracking zone, and vaporizing portions thereof by flashing the same under reduced pressure, passing the residuum vapors into a refluxing zone, withdrawing condensate under sudden reduction of pressure from said rectifying zone into a second refluxing zone, wherein substantial portions of said condensate are vaporized, passing unvaporized portions of said condensate into said first mentioned refluxing zone in contact with the vapors produced from said withdrawn residuum, and passing the combined condensate collecting in said first mentioned refluxing zone into said cracking zone.

11. In the conversion of higher boiling hydrocarbons into lower boiling ones, the process that comprises subjecting oil to cracking and vaporization under superatmospheric pressure in a cracking zone, subjecting evolved vapors while still under superatmospheric pressure to fractionation in a high pressure fractionating zone to form a condensate, expanding residue from the cracking zone into a low pressure zone where vaporization takes place, passing the evolved vapors into a low pressure fractionating zone, withdrawing condensate from the high pressure fractionating zone and directing the condensate into said low pressure fractionating zone to reflux vapors therein, subjecting the products in the low pressure fractionating zone to fractionation to form a reflux condensate and a vapor fraction, conducting said reflux condensate to the cracking zone, condensing the vapor fraction and conducting portions of the resultant distillate to reflux vapors in the low pressure fractionating zone.

GEORGE ARMISTEAD, Jr.
WM. T. DONALDSON.